US012715294B2

(12) United States Patent
Glöckner et al.

(10) Patent No.: US 12,715,294 B2
(45) Date of Patent: Aug. 25, 2026

(54) METHOD FOR OPERATING AN ELECTRIC DRIVETRAIN FOR A WORKING MACHINE, ELECTRIC DRIVETRAIN FOR A WORKING MACHINE, AND WORKING MACHINE

(71) Applicant: ZF FRIEDRICHSHAFEN AG, Friedrichshafen (DE)

(72) Inventors: Rico Glöckner, Pocking (DE); Migen Bebeti, Munich (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 234 days.

(21) Appl. No.: 18/002,275

(22) PCT Filed: Jun. 15, 2021

(86) PCT No.: PCT/EP2021/066080
§ 371 (c)(1),
(2) Date: Dec. 19, 2022

(87) PCT Pub. No.: WO2021/259703
PCT Pub. Date: Dec. 30, 2021

(65) Prior Publication Data

US 2023/0226913 A1 Jul. 20, 2023

(30) Foreign Application Priority Data

Jun. 24, 2020 (DE) .................... 10 2020 207 831.9

(51) Int. Cl.
*B60L 1/00* (2006.01)
*B60L 15/20* (2006.01)
(Continued)

(52) U.S. Cl.
CPC ............... *B60L 1/003* (2013.01); *B60L 15/20* (2013.01); *E02F 9/2203* (2013.01); *E02F 9/26* (2013.01);
(Continued)

(58) Field of Classification Search
CPC ...... B60L 1/003; B60L 15/20; B60L 2200/40; E02F 9/2203; E02F 9/26; E02F 3/431; E02F 9/225
See application file for complete search history.

(56) References Cited

U.S. PATENT DOCUMENTS

2014/0371915 A1* 12/2014 Ishihara ................ B60W 10/06 700/275
2018/0236878 A1 8/2018 Münst et al.
2021/0025137 A1 1/2021 Legner

FOREIGN PATENT DOCUMENTS

DE 202014000738 U1 3/2014
DE 102018203622 A1 9/2019
(Continued)

OTHER PUBLICATIONS

English Translation of DE10216308A1 Title: Wheel Loaders Author: Tokunaga Kaoru Date: Feb. 22, 2007 (Year: 2007).*
(Continued)

*Primary Examiner* — Steven Vu Nguyen
(74) *Attorney, Agent, or Firm* — LEYDIG, VOIT & MAYER, LTD.

(57) ABSTRACT

A method for operating an electric drivetrain of a working machine is provided wherein, the drivetrain includes a work drive with a hydraulic work device and an electric work motor, and a travel drive with an electric travel motor. The method includes operating the work drive independently of the travel drive, and supplying a power demanded by the work drive taking into account an efficiency of the work motor and an efficiency of the work device.

20 Claims, 3 Drawing Sheets

(51) Int. Cl.
*E02F 3/43* (2006.01)
*E02F 9/22* (2006.01)
*E02F 9/26* (2006.01)

(52) U.S. Cl.
CPC ........... *B60L 2200/40* (2013.01); *E02F 3/431* (2013.01); *E02F 9/225* (2013.01)

(56) References Cited

FOREIGN PATENT DOCUMENTS

| | | | |
|---|---|---|---|
| EP | 0664273 | A1 | 7/1995 |
| EP | 0962597 | A2 | 12/1999 |

OTHER PUBLICATIONS

English Translation of JP2015136994A Title: Work Vehicle and Method for Controlling Thereof Author: Miyamoto et al. Date: Jul. 30, 2015 (Year: 2015).*

English Translation of JP2014094802A. Title: Boom Lift Author: Nakazawa et al. Date: May 22, 2014 (Year: 2014).*

Wdaah Lamyaa et al., “Efficiency analysis of an electrification concept for a catering Truck,” IEEE Transportation Electrification Conference and Expo, Asia Pacific, Jun. 2016, pp. 837-842, IEEE, Busan, Korea (South).

* cited by examiner

METHOD FOR OPERATING AN ELECTRIC DRIVETRAIN FOR A WORKING MACHINE, ELECTRIC DRIVETRAIN FOR A WORKING MACHINE, AND WORKING MACHINE

CROSS REFERENCE TO RELATED APPLICATIONS

This application is a U.S. National Phase application under 35 U.S.C. § 371 of International Application No. PCT/EP2021/066080 filed on Jun. 15, 2021, and claims benefit to German Patent Application No. DE 10 2020 207 831.9, filed on Jun. 24, 2020. The International Application was published in German on Dec. 30, 2021 as WO 2021/259703 A1 under PCT Article 21(2).

FILED

The present invention relates to a method for operating an electric drivetrain of a working machine according to the preamble of claim 1, an electric drivetrain for a working machine according to the preamble of claim 9, and a corresponding working machine.

BACKGROUND

In the prior art, electrically driven working machines, such as wheel loaders, skid-steer loaders, telescopic loaders, dumpers or also excavators, are known. These electrically driven working machines are either purely electrically driven, i.e. they exclusively have an electric battery for their energy supply, or they are diesel-electrically driven, which means that the required energy is supplied by a diesel-driven generator, usually in conjunction with an electric buffer storage, such as an appropriately dimensioned capacitor. In all cases, the mechanical power required for the travel drive and the work drive is supplied by one or more electric motors. Furthermore, hybrid-electric working machines are also known in which the mechanical power required for operation is primarily supplied by an internal combustion engine, usually a diesel engine. An additionally provided electric motor is supplied by a battery and in this case typically performs a so-called boost function.

Furthermore, also known in the prior art are combustion-powered working machines in which a travel drive and a work drive are driven jointly by an internal combustion engine. The work drive generally has a hydraulic work system with a hydraulic pump, which is drivably coupled to the internal combustion engine either directly or via a transmission stage. However, since the internal combustion engine is controlled primarily according to the requirements of the travel drive in terms of the torque and the speed to be provided, the hydraulic pump is configured as a variable displacement pump, which can provide a volume flow and a hydraulic pressure by adjusting a swivel angle within a certain range independently of its rotational speed.

In this context, DE 20 2014 000 738 U1 describes a wheel loader, driven purely electromotively, which has a first electric motor for a travel drive and a second electric motor for a work drive.

EP 0 962 597 A2 describes a battery-powered working machine with two electric motors for the travel drive and a further electric motor for the work drive.

However, the known electrically driven working machines have the disadvantage that the work drive or a hydraulic work system of the work drive is usually driven by an electric motor assigned exclusively to the work drive, without meaningfully utilizing the degrees of freedom resulting from this decoupling from the travel drive.

SUMMARY

In an embodiment, the present disclosure provides a method for operating an electric drivetrain of a working machine wherein the drivetrain includes a work drive with a hydraulic work device and an electric work motor and a travel drive with an electric travel motor. The method includes operating the work drive independently of the travel drive, and supplying a power demanded by the work drive taking into account an efficiency of the work motor and an efficiency of the work device.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
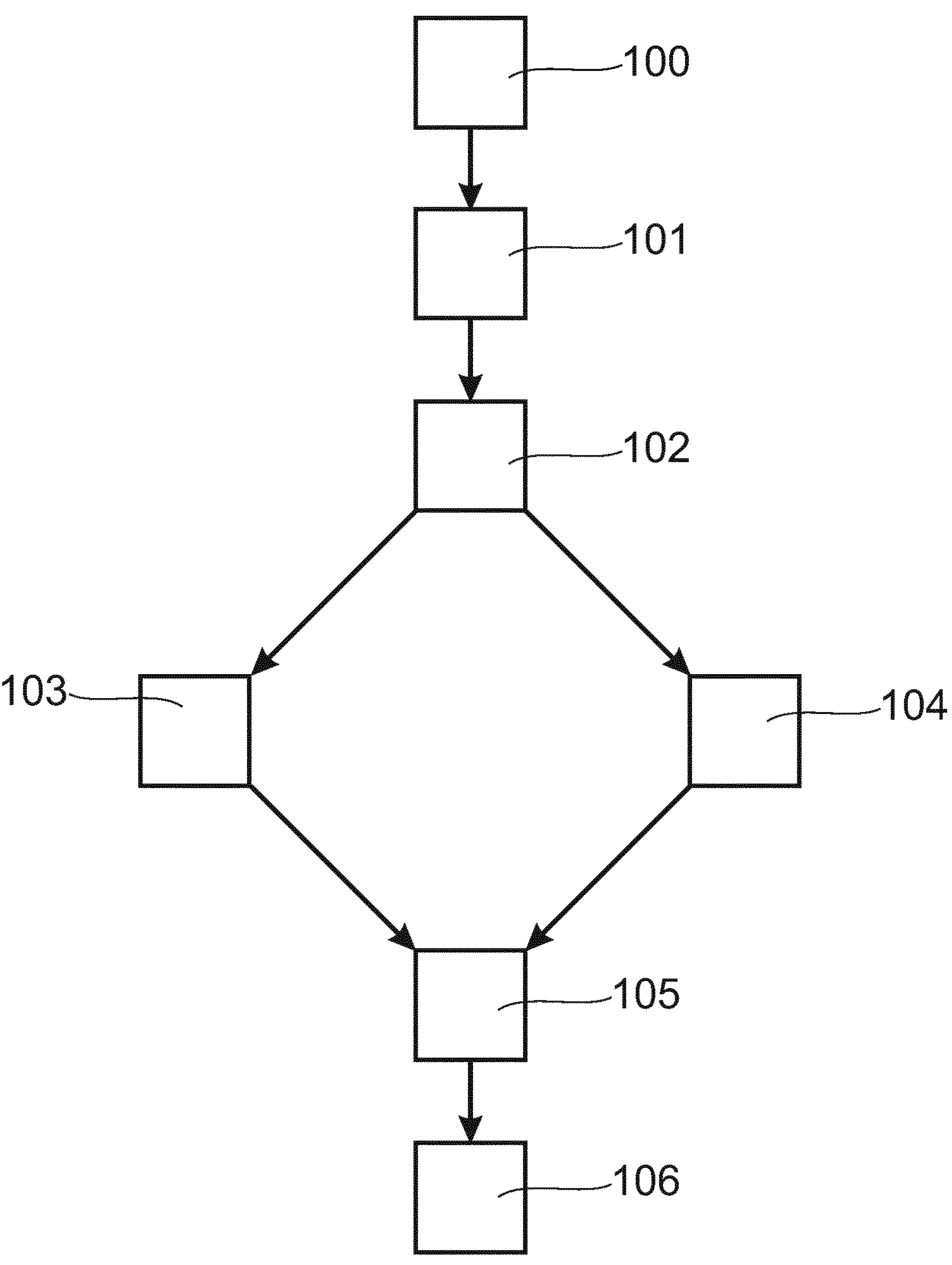
FIG. 1 shows in the form of a flow diagram, an example of a possible embodiment of a method according to the invention for operating an electric drivetrain of a working machine configured as a wheel loader.

It is an object of the invention to propose an improved method for operating an electric drivetrain of a working machine.

This object is achieved according to the invention by the method for operating an electric drivetrain of a working machine according to claim 1. Advantageous embodiments and further configurations of the invention are apparent from the dependent claims.

The invention relates to a method for operating an electric drivetrain of a working machine, wherein the drivetrain comprises a work drive with a hydraulic work device and an electric work motor, and a travel drive with an electric travel motor, wherein an operation of the work drive is carried out independently of an operation of the travel drive. The method according to the invention is characterized in that a power demanded by the work drive is supplied taking into account an efficiency of the work motor and an efficiency of the work device.

The invention thus describes a method which relates to the operation of an electric drivetrain of a working machine, the drivetrain comprising at least two drives, which can be operated independently of one another, namely the work drive and the travel drive. In accordance with the invention "drives that can be operated independently of one another" are understood to include at least two drives, namely the travel drive and the work drive, between which there is no interaction during operation. The operation of the work drive can therefore take place completely independently of the operation of the travel drive and vice versa, i.e. an operating point of the travel drive can be set independently of an operating point of the work drive.

It is also conceivable and preferred that the drivetrain also comprises further elements or further drives, for example auxiliary output drives or auxiliary drives. These can, for example, also be operated independently of one another and/or independently of the travel drive and the work drive. However, in this case it is also conceivable to couple these further drives at least partially to one another or to the travel drive or to the work drive. For example, several of the other drives can have a common drive motor or can be driven by the travel motor or the work motor, so that a drivable coupling exists.

In particular, the drivetrain also comprises an electric energy storage device, preferably in the form of a rechargeable electric battery.

Each of the work drive and the travel drive advantageously comprise one or more electric motors. In addition, they can comprise gearboxes or transmission stages, output drives, hydraulic components, control electronics and power electronics. Particularly advantageously, the electric motors for the travel drive and for the work drive are identically constructed. This allows cost-reducing effects on the number of parts required for the electric motors.

The work drive also comprises a hydraulic work device, which is driven by the work motor. The hydraulic work device in turn preferably comprises a hydraulic pump, in particular a so-called variable displacement pump, which can provide a volumetric flow and a hydraulic pressure by adjusting a swivel angle within a certain range independently of its rotational speed, and which is driven directly or via a transmission stage by the work motor.

According to the invention, it is now provided that a power demanded by the work drive is supplied taking into account an efficiency of the work motor and an efficiency of the work device. Both the work motor and the work device usually each have an efficiency that depends on the operating point. In this context, the efficiency of the work motor, which is configured as an electric motor, is usually lower in the peripheral ranges, i.e., at comparatively low speeds and at comparatively high speeds, than in a mid-operating range. Likewise, the work device, for example configured as a variable displacement pump, has a higher efficiency in the range of comparatively large swivel angles than in the range of comparatively small swivel angles. For supplying the power required by the work drive, there are thus several possible combinations of operating points of the work motor and the work device. The overall efficiency of the work drive is thus largely determined by the mathematical product of the efficiency of the work motor and the efficiency of the work device.

Taking into account the efficiency of the work motor and the efficiency of the work device according to the invention, now results in the advantage that the most efficient overall efficiency of the work drive can be set in each case in order to supply the power required by the work drive. Thus, in addition to energy savings and the associated cost savings, particularly in the case of a battery-electric drivetrain, this also results in an extended operating time before a charging process of the electric energy storage device—and thus an interruption of the working operation—becomes necessary.

According to a preferred embodiment of the invention, it is provided that a change in the supplied power is made taking into account a moment of inertia of the work motor. Since the work motor is configured as an electric motor, it has a comparatively large moment of inertia due to its design, which counteracts a required change in rotational speed and can only be overcome by applying a correspondingly large amount of electrical energy, which is then available as rotational energy. It is now the realization of the applicant that, for the most efficient operation of the work drive, not only the efficiencies of the work motor and the work hydraulics may be considered, but additionally the intrinsic energy absorption of the work motor required for changing an operating point, in particular with regard to the rotational speed. It has become apparent that, under certain circumstances, it may be more efficient to leave the work motor at an already set operating point, although a different operating point of the work motor would be more efficient for supplying a changed power, and instead only to change the operating point of the work device accordingly, even if the work device is not operated at a more efficient operating point than it was before.

Preferably, it is provided that the change of the supplied power also takes place taking into account a moment of inertia of the work device. The work device also generally has a moment of inertia that counteracts a demanded speed change.

According to a further preferred embodiment of the invention, it is provided that the demanded power is supplied taking into account needs of a hydraulic power steering assistance. Thus, it is advantageously provided that the working machine comprises a steering system with a hydraulic power steering assistance, wherein the hydraulic power steering assistance is supplied with a necessary hydraulic power by the work drive. By also taking into account the power needed by the hydraulic power steering assistance when selecting the operating points of the work engine and the work device and/or when changing the operating points, the power needed by the work drive can be supplied even more efficiently.

According to a further preferred embodiment of the invention, it is provided that a rotational speed of the work device does not become zero during operation of the drivetrain. This results in the advantage that, on the one hand, the work drive does not have to react from a standstill to a request for the provision of a power, which generally not only leads to a short-term but nevertheless noticeable delay in the reaction of the work drive, but also does not have to be operated at an unfavorable operating point due to the necessary rapid acceleration of the work motor and the work device. Instead, the overall operating point of the work drive, necessary to supply the demanded power, can be set comparatively slowly and thus efficiently.

According to a particularly preferred embodiment of the invention, it is provided that the change is prepared for taking into account a situation detection. By detecting on the basis of an occurring situation that a change of the power to be supplied by the work drive will take place, the change, e.g. of the rotational speed of the work motor, does not have to take place abruptly and comparatively inefficiently, but can already be initiated in advance at an earlier point in time, which allows e.g. a slower and comparatively efficient increase of the rotational speed.

According to a particularly preferred embodiment of the invention, it is provided that the situation detection is carried out by means of environment sensors. Suitable environment sensors can be, in particular, camera sensors, radar sensors or lidar sensors. For example, the environment sensor system, in particular in conjunction with a suitable sensor data evaluation, enables the detection of situations in which the use of the work device will be imminent. For example, it can be detected that a working machine configured as a wheel loader is approaching an earth pile in order to drive a bucket into the earth pile and pick up earth. As a result, a speed of the work motor can be slowly increased in preparation.

According to another particularly preferred embodiment of the invention, it is provided that the situation detection is carried out by monitoring a state of the work drive. A "state" of the work drive is understood to mean both a volume flow and a hydraulic pressure in the work drive. Preferably, it is also understood to include, for example, a height of a lift mast and/or a position and an orientation of a bucket and a bucket arm, provided that the work device comprises them. Likewise, an input means for controlling the work drive, for example a joystick configured for this purpose, can advantageously also be used for the situation detection by evaluating its actuation signals. Thus, for example, an imminent change in the power demanded by the work drive can be detected on the basis of known and repetitive patterns. Therefore, for example, if a working machine configured as a wheel loader tilts a bucket downward and then lowers it, it can be detected that the bucket is very likely to pick up and lift a load, for which a high power must be supplied by the work drive for a certain period of time.

According to another especially preferred embodiment of the invention, it is provided that the change in the power supplied is made taking into account an electrical power allocated to the work drive and the travel drive. Depending on the construction of the drivetrain and/or the electric energy storage device, the travel drive and the work drive, it may be the case that the energy storage device cannot simultaneously provide the electrical energy demanded by the travel drive and the electrical energy demanded by the work drive in the respective demanded amount. In such a situation, an operator of the working machine may, for example, divide the maximum electrical power available from the energy storage device between the travel drive and the work drive in a fixed ratio. By taking this possibly limited electrical power available for the work drive into account when changing the power to be supplied by the work drive, any otherwise possibly occurring malfunction of the work drive and any possibly resulting occurrence of a dangerous situation can be advantageously avoided.

The invention further relates to an electric drivetrain for a working machine, wherein the drivetrain comprises a work drive having a hydraulic work device and an electric work motor, and a travel drive having an electric travel motor, and wherein the work drive is operable independently of the travel drive. The drivetrain according to the invention is characterized in that the drivetrain is configured to supply a power demanded by the work drive taking into account an efficiency of the work motor and an efficiency of the work device.

The drivetrain according to the invention thus enables the method according to the invention to be carried out, which leads to the advantages already described in connection with the method according to the invention.

The hydraulic work device preferably comprises a so-called swivel pump. Particularly preferably, the work device further comprises a hydraulically operable bucket and a hydraulically operable lifting arm for lifting and lowering the bucket.

Preferably, the work drive further comprises an electronic memory that contains an electronically retrievable efficiency map of the work motor. The efficiency map of the work motor advantageously describes an efficiency of the work motor as a function of a provided rotational speed of the work motor and a provided torque of the work motor.

A provided rotational speed of the work motor and a provided torque of the work motor can advantageously be accessed from an inverter of the work drive, wherein the inverter is provided for controlling the work motor.

Also preferably, the electronic memory further includes an efficiency map of the work device. The efficiency map can, for example, describe an efficiency of the work device as a function of a swivel angle of a swivel pump and a rotational speed of the swivel pump of the work device.

Preferably, the drivetrain also comprises an electrical energy storage device, which, for example, may be configured as a rechargeable battery.

The invention further relates to a working machine comprising a drivetrain according to the invention. From this, the advantages already described in connection with the drivetrain according to the invention also result for the working machine according to the invention.

According to a preferred embodiment of the invention, it is provided that the working machine is configured as a wheel loader.

The invention is explained below by way of examples of embodiments shown in the figures.

Identical objects, functional units and comparable components are designated with the same reference numerals across all figures. These objects, functional units and comparable components are identical with regard to their technical features unless the description explicitly or implicitly states otherwise.

FIG. 1 shows an example of a possible embodiment of a method according to the invention for operating an electric drivetrain 11 of a working machine 10 configured as a wheel loader 10 in the form of a flow diagram. In this case, the drivetrain 11 comprises a work drive 20 with a hydraulic work device 22 and an electric work motor 21, as well as a travel drive 30 with an electric travel motor 31. The hydraulic work device 22 in turn comprises a hydraulic pump 23 configured as a swivel pump 23, as well as a bucket 24 and a lifting arm 25 for lifting and lowering the bucket 24. Operation of the work drive 20 is possible independently of operation of the travel drive 30, i.e., an operating point of the travel drive 30 can be set independently of an operating point of the work drive 20 and vice versa. In a first process step 100, a first demanded power is supplied by the work drive 20. The first demanded power thereby fulfills the requirements of a hydraulic power steering assist of the working machine 10 as well as a lubricant pump in a travel transmission 33. In a second process step 101, a situation detection is carried out, wherein it is determined by means of a steering angle detection, by means of a speed detection and by means of environment sensors 12, such as a plurality of camera sensors 12, that the wheel loader 10 approaches an earth pile in a straight line without reducing its speed. Taking this situation detection into account, it is detected in step 102 that an increase of the first demanded power of the work drive 20 to a second demanded power is imminent. In this case, the second demanded power is so large that it can continue to supply the hydraulic power steering assist and the lubricant pump, and can additionally supply the work device 22 with the power that is expected to be needed. In step 103, it is now determined at which efficiency of the work motor 21 and at which efficiency of the work device 22 the second power can be supplied most efficiently overall. At the same time, in step 104, it is determined how the change of the supplied power, i.e. the change from the first power to the second power, can be most efficiently carried out taking into account a moment of inertia of the work motor 22. Since an increase in the rotational speed of the work motor 22 is required, a certain amount of energy must be applied just to increase the rotational energy of the work motor 22 without being available to supply the second power. Therefore, in step 105, taking into account the efficiency of the work motor 21 and the efficiency of the work device 22, and taking into account the moment of inertia of the work motor 22, it is determined how the second power can be supplied most efficiently for an expected period of time. In step 106, a corresponding control of the work motor 21 and the work device 22 or the swivel pump 23 is carried out.

Figure 2:
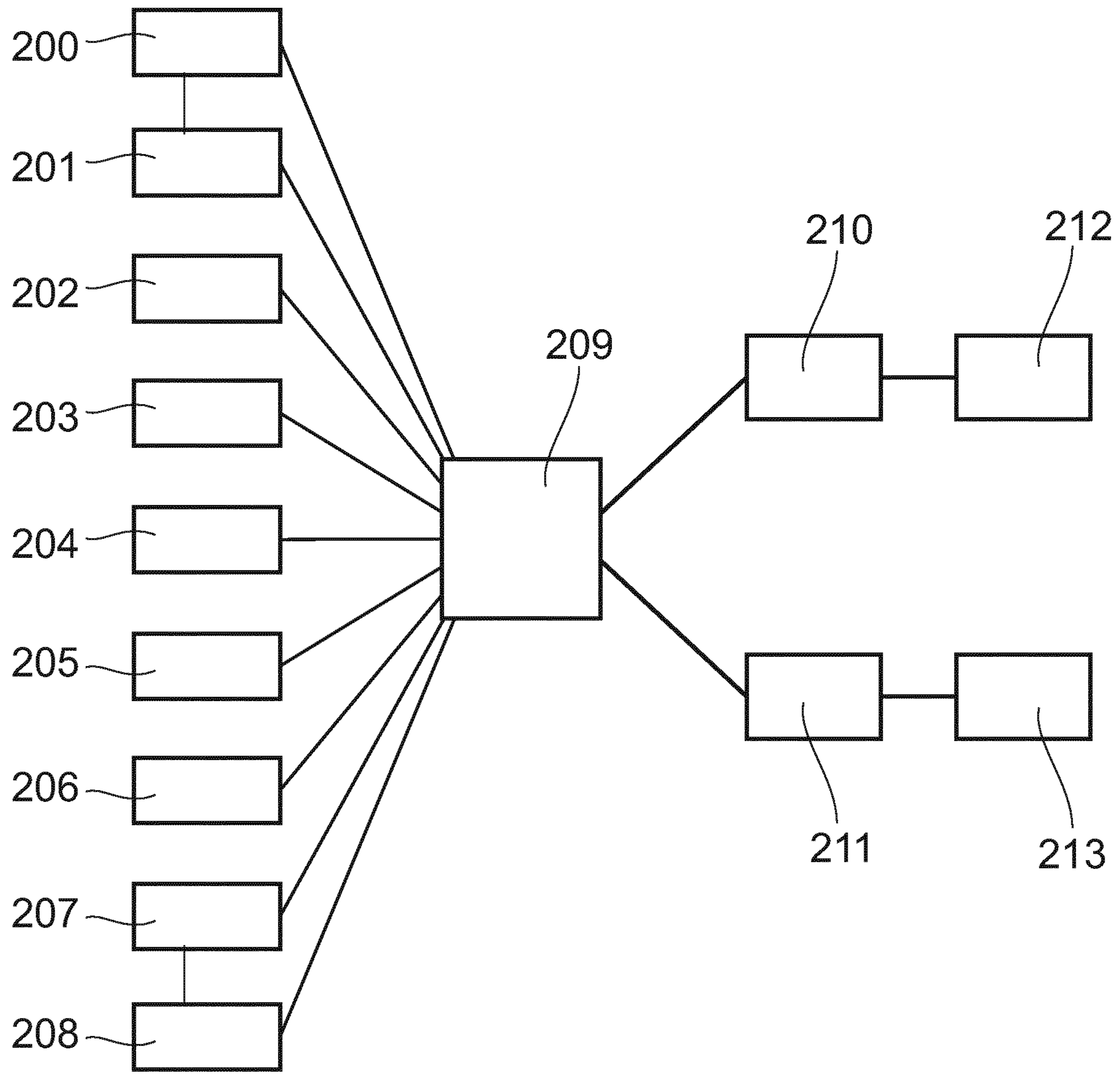
FIG. 2 shows in the form of a functional diagram, an example of a possible embodiment of a method according to the invention for operating an electric drivetrain of a working machine.

FIG. 2 shows an example of a possible embodiment of a method according to the invention for operating an electric drivetrain 11 of a working machine 10 in the form of a functional diagram. In this case the drivetrain 11 comprises a work drive 20 with a hydraulic work device 22 and an electric work motor 21 as well as a travel drive 30 with an electric travel motor 31. The hydraulic work device 22 in turn comprises a hydraulic pump 23 configured as a swivel pump 23 as well as a bucket 24 and a lifting arm 25 for lifting and lowering the bucket 24. Operation of the work drive 20 is possible independently of operation of the travel drive 30, i.e., an operating point of the travel drive 30 can be set independently of an operating point of the work drive 20, and vice versa. In this regard, the function blocks 200 to 213 illustrate the method according to the invention for changing the supplied power from a first power to a second power. In a first function block 200, a necessary volumetric flow requirement for the travel transmission 33 and the power to be supplied for this purpose by the work motor 31 are determined. In function block 201, actuation signals of an input means for controlling the work drive 20, for example a joystick configured for this purpose, are read out in order to perform a situation detection by means of monitoring a state of the work drive 20. Function block 202 describes a situation detection by means of an environment sensor system 12, for example by means of camera sensors, radar sensors and ultrasonic sensors. In function block 203, a position of a lift equipment belonging to the work device 22 is detected. Function block 204 describes the detection of a set swivel angle of a swivel pump 23 also belonging to the work device 22. Function block 205 describes the detection of that portion of a maximum deployable electric power of an electric energy source which is available for the work drive 20. Finally, in function block 206, an efficiency map of the work motor 21 is read out from an electronic memory, and in function block 207, an efficiency map of the swivel pump 23 is read out from the electronic memory. A moment of inertia of the work motor 21 is also read out from the electronic memory in function block 208. From the situation detection information collected in blocks 200 to 208, a determination is made in function block 209 as to how to change the operating point of the work motor 21 and the swivel pump 23 to achieve the most efficient operating point for supplying the second power in the most efficient way. The information about the most efficient operating point for supplying the second power as well as the most efficient way for reaching this operating point starting from the current operating point with respect to the work motor 21 is output to an inverter of the work drive 20 in function block 210. At the same time, in function block 211, the information about the most efficient operating point for supplying the second power in the most efficient way with respect to the swivel pump 23 is output to an actuator of the swivel pump 23. The inverter then controls the work motor 21 in function block 212 and the actuator controls the swivel pump 23 in function block 213.

Figure 3:
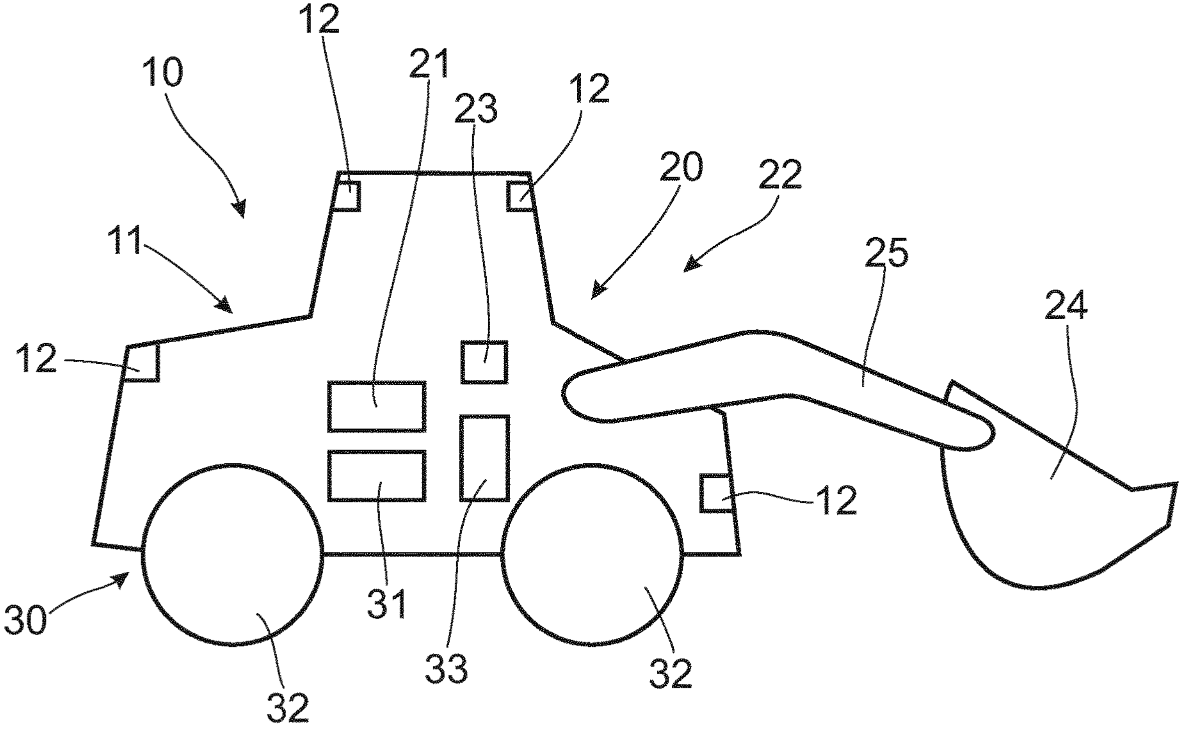
FIG. 3 shows exemplary and schematically, a possible design of a working machine according to the invention.

FIG. 3 shows exemplarily and schematically a possible embodiment of a working machine 10 according to the invention. The working machine 10 is configured exemplarily as a wheel loader 10 and comprises an electric drivetrain 11. The electric drivetrain 11 in turn comprises a work drive 20 with an electric work motor 21 and a hydraulic work device 22 as well as a travel drive 30 with an electric travel motor 31 and driven vehicle wheels 32. The work drive 20 in turn comprises a hydraulic pump 23 configured as a swivel pump 23, as well as a bucket 24 and a lifting arm 25 for lifting and lowering the bucket 24. The vehicle wheels 32 are rigidly drivably couplable to the travel motor 31 via a travel transmission 33. The drivetrain 11 is configured to supply a power demanded by the work drive 20 taking into account an efficiency of the work motor 21 and an efficiency of the work device 22. An imminent change of the supplied power is carried out taking into account a moment of inertia of the work motor 21 and is prepared in advance taking into account a situation detection. The situation detection is carried out by means of an environment sensor system 12 suitable for this purpose, for example by means of camera sensors 12.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

10 working machine, wheel loader
11 electric drivetrain
12 environment sensor system, camera sensor
20 work drive
21 work motor
22 hydraulic work device
23 hydraulic pump, swivel pump
24 bucket
25 lifting arm
30 travel drive
31 travel motor
32 vehicle wheel
33 travel transmission
100 supplying of the demanded power
101 situation detection

102 recognizing that an increase in the demanded power is imminent
103 determining of the efficiency
104 determining of the most efficient way to change the power
105 determining how to most efficiently supply the demanded power
106 control of the work motor and the work device
200 determining of the power to be supplied
201 situation detection by means of monitoring a state of the work drive
202 situation detection by means of an environment sensor system
203 detecting of a position of a lifting equipment
204 detecting of a set swivel angle
205 detecting of the electrical power available for the work drive
206 reading out of an efficiency map of the work motor
207 reading out of an efficiency map of the swivel pump
208 reading out of a moment of inertia of the work motor
209 determining how to supply the demanded power most efficiently
210 output to an inverter
211 output to the actuator of the swivel pump
212 control of the work motor
213 control of the actuator

The invention claimed is:

1. A method for operating an electric drivetrain of a working machine, the drivetrain comprising a work drive with a hydraulic work device and an electric work motor, and a travel drive with an electric travel motor, the method comprising:
- operating the work drive independently of the travel drive such that there is no interaction of the work drive with the travel drive, and
- supplying a power demanded by the work drive based on the mathematical product of an efficiency of the electric work motor and an efficiency of the hydraulic work device,
- wherein the supplying of the power demanded by the work drive is carried out to prevent a rotational speed of a swivel pump of the hydraulic work device from becoming zero during operation of the travel drive.

2. The method according to claim 1, further comprising effecting a change in the supplied power based on a moment of inertia of the electric work motor.

3. The method according to claim 2, wherein the effecting of the change is performed based on a situation detection.

4. The method according to claim 3, wherein the situation detection is performed using an environment sensor system.

5. The method according to claim 3, wherein the situation detection is performed by monitoring of a state of the work drive.

6. The method according to claim 5, wherein the state of the work drive includes both a volume flow and a hydraulic pressure in the work drive.

7. The method according to claim 5, wherein the state of the work drive includes a height of a lift mast and/or a position and orientation of a bucket and bucket arm.

8. The method according to claim 5, further comprising determining an imminent change in power demanded by the work drive based on known and repeated patterns of inputs for controlling the work drive.

9. The method according to claim 2, wherein the effecting of the change in the supplied power is performed based on an electric power allocated to the work drive and the travel drive.

10. The method according to claim 1, wherein the supplying of the demanded power is also based on needs of a hydraulic power steering assist.

11. The method according to claim 1, wherein the electric work motor has a moment of inertia that counteracts a demanded speed change.

12. An electric drivetrain for a working machine, comprising:
- a work drive with a hydraulic work device and an electric work motor; and
- a travel drive with an electric travel motor,
- wherein the work drive is operable independently of the travel drive,
- wherein the drivetrain is configured to supply a power demanded by the work drive based on the mathematical product of an efficiency of the electric work motor and an efficiency of the hydraulic work device, and
- wherein the drivetrain is further configured to supply the power demanded by the work drive to prevent a rotational speed of a swivel pump of the hydraulic work device from becoming zero during operation of the travel drive.

13. A working machine comprising a drivetrain according to claim 12.

14. The working machine according to claim 13, wherein the working machine is configured as a wheel loader.

15. A method for operating an electric drivetrain of a working machine, the drivetrain comprising a work drive with a hydraulic work device and an electric work motor, and a travel drive with an electric travel motor, the method comprising:
- operating the work drive independently of the travel drive such that there is no interaction of the work drive with the travel drive;
- supplying a power demanded by the work drive based on the mathematical product of an efficiency of the electric work motor and an efficiency of the hydraulic work device;
- determining an optimal overall efficiency of the electric work motor;
- determining an optimal overall efficiency of the work drive;
- determining a moment of inertia of the electric work motor; and
- changing power supplied to the work drive based on the determined optimal overall efficiency of the electric work motor, the determined optimal overall efficiency of the work drive, and the determined moment of inertia of the electric work motor.

16. The method according to claim 15, wherein the optimal overall efficiency of the electric work motor is based on a speed of the electric work motor, and wherein the work drive is a variable displacement pump and the optimal overall efficiency of the work drive is based on a swivel angle of the variable displacement pump.

17. The method according to claim 15, wherein changing the power supplied to the work drive is based on a moment of inertia of the electric work motor.

18. The method according to claim 17, wherein changing the power supplied to the work drive is based on a situation detection.

19. The method according to claim 18, wherein the situation detection is performed using an environment sensor system.

20. The method according to claim 15, wherein changing the power supplied to the work drive is also based on needs of a hydraulic power steering assist.

* * * * *